United States Patent
Pillai et al.

(10) Patent No.: US 12,358,821 B2
(45) Date of Patent: Jul. 15, 2025

(54) METHOD AND SYSTEM FOR WASTE TREATMENT

(71) Applicants: The Texas A&M University System, College Station, TX (US); Chevron U.S.A. Inc., Richmond, CA (US)

(72) Inventors: Suresh D. Pillai, College Station, TX (US); David Staack, College Station, TX (US); John Lassalle, College Station, TX (US); Thomas Hoelen, Berkeley, CA (US); Paul Bireta, Houston, TX (US)

(73) Assignees: The Texas A&M University System, College Station, TX (US); Chevron U.S.A. Inc., Richmond, CA (US)

( * ) Notice: Subject to any disclaimer, the term of this patent is extended or adjusted under 35 U.S.C. 154(b) by 478 days.

(21) Appl. No.: 17/790,336

(22) PCT Filed: Dec. 31, 2020

(86) PCT No.: PCT/US2020/067720
§ 371 (c)(1),
(2) Date: Jun. 30, 2022

(87) PCT Pub. No.: WO2021/138593
PCT Pub. Date: Jul. 8, 2021

(65) Prior Publication Data
US 2023/0083257 A1    Mar. 16, 2023

Related U.S. Application Data

(60) Provisional application No. 62/956,953, filed on Jan. 3, 2020.

(51) Int. Cl.
C02F 9/00    (2023.01)
C02F 1/30    (2023.01)
(Continued)

(52) U.S. Cl.
CPC .............. *C02F 9/00* (2013.01); *C02F 1/305* (2013.01); *C02F 11/04* (2013.01); *C02F 11/123* (2013.01); *C02F 11/13* (2019.01); *C02F 2101/36* (2013.01)

(58) Field of Classification Search
None
See application file for complete search history.

(56) References Cited

U.S. PATENT DOCUMENTS 3,901,807 A * 8/1975 Trump .................... C02F 1/30
                                                    422/187
5,702,572 A   12/1997 Fujimura et al.
(Continued)

FOREIGN PATENT DOCUMENTS

WO    WO-2014/176508 A2    10/2014

OTHER PUBLICATIONS

"Hyphen Use," Purdue (University) Online Writing Lab, https://owl.purdue.edu/owl/general_writing/punctuation/hyphen_use.html, downloaded 2024 (Year: 2024).*

*Primary Examiner* — Chester T Barry
(74) *Attorney, Agent, or Firm* — Winstead PC (57) ABSTRACT

A method of waste treatment includes treating partially-dewatered matrix with a first electron-beam radiation dose. The treated partially-dewatered matrix is transferred to a digester where the treated partially-dewatered matrix is subjected to anaerobic digestion. Biogas is recovered from the treated partially-dewatered matrix during the anaerobic digestion. The treated partially-dewatered matrix is dried and subjected to a second electron-beam radiation dose.

20 Claims, 3 Drawing Sheets

(51) Int. Cl.
    *C02F 11/04*     (2006.01)
    *C02F 11/123*    (2019.01)
    *C02F 11/13*     (2019.01)
    *C02F 101/36*    (2006.01)

(56) References Cited

U.S. PATENT DOCUMENTS

| | | | |
|---|---|---|---|
| 5,744,037 A * | 4/1998 | Fujimura | C02F 3/28 |
| | | | 210/903 |
| 2010/0072134 A1 | 3/2010 | Mader | |
| 2010/0280137 A1 | 11/2010 | Kukkonen et al. | |
| 2013/0032547 A1 * | 2/2013 | Pillai | C02F 1/30 |
| | | | 210/748.16 |
| 2013/0213883 A1 | 8/2013 | Josse et al. | |
| 2013/0288307 A1 | 10/2013 | Medoff | |
| 2014/0305856 A1 | 10/2014 | Deskins | |
| 2015/0164108 A1 * | 6/2015 | Logan | A23K 10/12 |
| | | | 435/71.1 |
| 2016/0184791 A1 | 6/2016 | Appelbaum | |
| 2018/0086656 A1 | 3/2018 | Murthy | |
| 2019/0366296 A1 | 12/2019 | Appelbaum | |

* cited by examiner

METHOD AND SYSTEM FOR WASTE TREATMENT

CROSS-REFERENCE TO RELATED APPLICATIONS

This application claims priority to, and incorporates by reference the entire disclosure of, U.S. Provisional Patent Application No. 62/956,953, filed on Jan. 3, 2020.

STATEMENT REGARDING FEDERALLY-FUNDED RESEARCH

This invention was made with government support under grant number W912HQ18C0040 awarded by the Department of Defense Strategic Environmental Research and Development Program and grant number 83965001 awarded by the Environmental Protection Agency. The government has certain rights in the invention.

TECHNICAL FIELD

The present disclosure relates generally to waste treatment and generation of value products and more particularly, but not by way of limitation, to waste treatment utilizing electron-beam radiation to break down contaminants such as polyfluorinated chemical ("PFAS") compounds coupled with enhanced methane generation in anaerobic digesters.

BACKGROUND

This section provides background information to facilitate a better understanding of the various aspects of the disclosure. It should be understood that the statements in this section of this document are to be read in this light, and not as admissions of prior art.

Pollution of groundwater and soil by, for example, municipal and industrial waste strains containing hydrocarbons, fluorocarbons, chlorocarbons, pharmaceuticals, microbial pathogens, and over 7,500 other potential contaminants constitutes an environmental issue in need of urgent attention. Intermediate range molecules, in particular, degrade slowly, are mobile in soil, and thus pose a significant environmental threat. Without remediation, such pollution can lead to contamination of the water table leading to pollution of water supplies used for, for example, crop irrigation and human consumption. These contaminants can exist in small concentrations adsorbed to soil particulates, dissolved in soil moisture, or in surface or ground water matrices. Methods for remediation of groundwater and soil must be economically deployable at large scale in addition to being fast and efficient. Many contaminants are byproducts of human consumption and industrial processes and pass through wastewater treatment facilities.

SUMMARY

In various embodiments, aspects of the disclosure relate to a method of waste treatment. The method includes treating a partially-dewatered matrix with a first electron-beam radiation dose. The electron-beam treated partially-dewatered matrix is transferred to a digester where the treated partially-dewatered matrix is subjected to anaerobic digestion. Biogas is recovered from the treated partially-dewatered matrix during the anaerobic digestion. The treated partially-dewatered matrix is further dewatered or dried and subjected to a second electron-beam radiation dose.

In various embodiments, aspects of the disclosure relate to a system for waste treatment. The system includes a dewatering stage that is coupled to a digester. The waste matrix exiting the dewatering stage is exposed to a first source of electron-beam radiation. A biogas recovery device is fluidly coupled to the digester. A dryer is coupled to the digester. The treated waste matrix is further dewatered using either vacuum filters, presses, centrifuges, or dryers. The dried waste matrix exiting the dryer is exposed to a second source of electron-beam radiation.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various embodiments will now be described more fully with reference to the accompanying drawings. The disclosure may, however, be embodied in many different forms and should not be construed as limited to the embodiments set forth herein.

Electron-beam (eBeam) technology is a chemical-free technology that utilizes linear electron accelerators (linacs) to generate extremely large numbers of highly energetic electrons from electricity. Linacs are capable of producing extremely large concentrations of highly energetic electrons ($>10^{15}$ electrons/cm$^2$/sec) which, when these electrons interact with water produce extremely large amounts of free radicals, hydrogen atoms, and additional aqueous electrons (Equation 1). Exposing soils, groundwater, liquid, solid, and semi-solid waste matrices to electron-beam irradiation causes extensive ionization reactions and highly reactive free radicals as shown in Equation 1:

$$e^- + H_2O \rightarrow [2.6]e^-_{aq} + [0.55]H^\cdot + [2.7]H_3O^+ + [0.7]H_2O_2 + [2.6]HO^\cdot + [0.55]H_2 \quad \text{(Equation 1)}$$

Where, the values in brackets represent the number of species produced by 0.1 MeV of energy absorbed, and H$^\cdot$, e$^-$, and HO$^\cdot$ are highly reactive species, while H$_3$O$^+$ is the hydrated proton. Electron beam application creates both reduction and oxidation processes without the addition of any chemicals. At high doses, temperatures also get involved in these complex reactions. These oxidation-reduction reactions occur almost instantaneously and therefore, best characterized as an Advanced Oxidation-Reduction Process (AORP).

Figure 1:
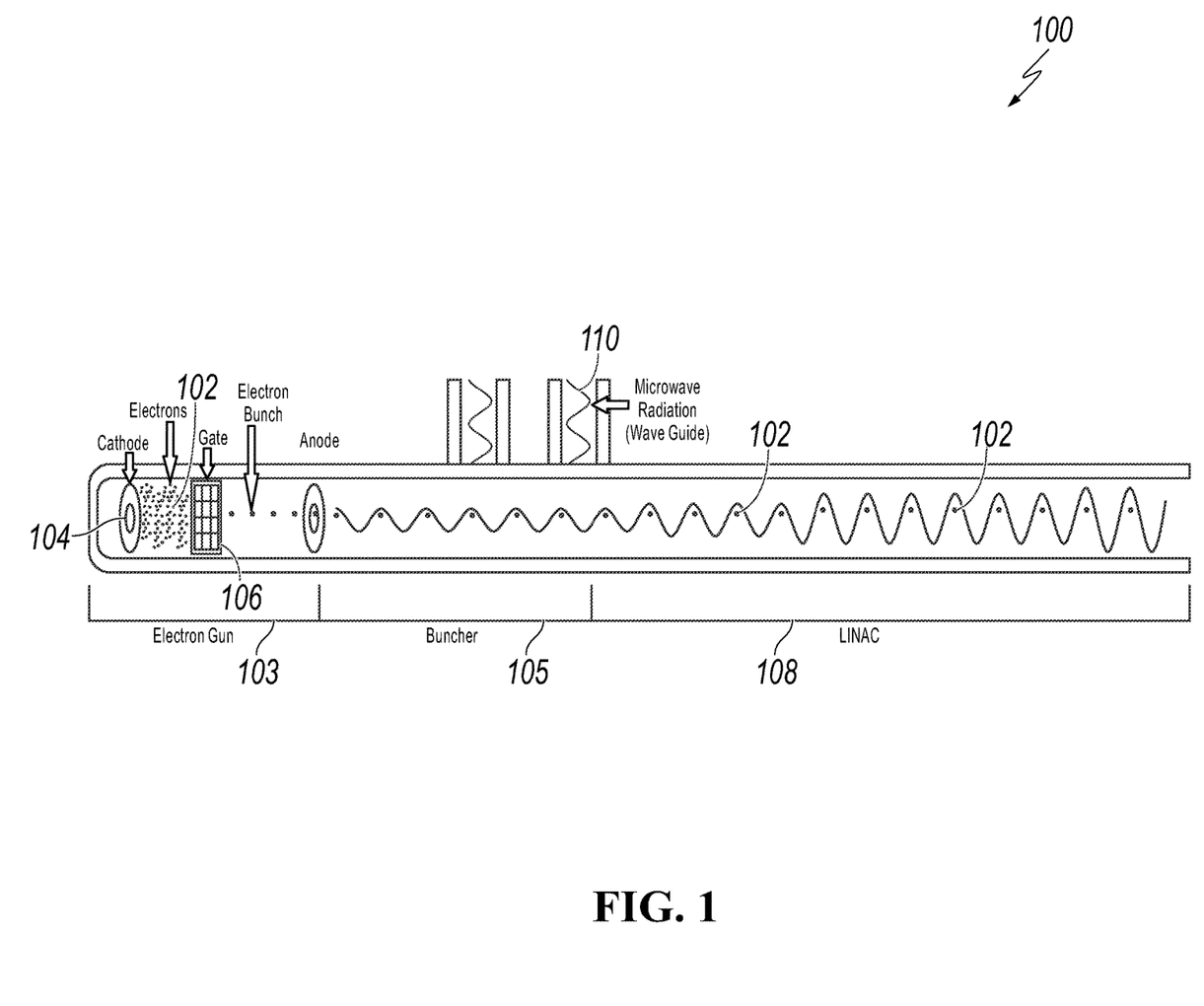
FIG. 1 is a simplified overview of an electron-beam radiation system according to aspects of the disclosure.

A simplified overview of an S-band linear electron-beam radiation system is shown by way of example in FIG. 1. In various embodiments, a variety of electron-beam generating systems such as, for example, S-band linacs, DC accelerators, and a Rhodotron™, electron-beam accelerator manufactured by IBA Industrial, could be utilized. The electron-beam radiation system 100 includes an electron gun 103, a buncher 105, and a linear accelerator 108. This electron beam works by first producing electrons 102 through thermionic emission from heating a barium cathode 104. The electrons 102 are passed through a high voltage gate 106. The electrons 102 are speed up, under vacuum, through the linear accelerator 108. The linear accelerator 108 utilizes S-band microwave radiation 110 produced by a klystron, acting as a waveguide. RF power further accelerates the electrons 102 by modulating the pulses received by different parts of the accelerator.

Figure 2:
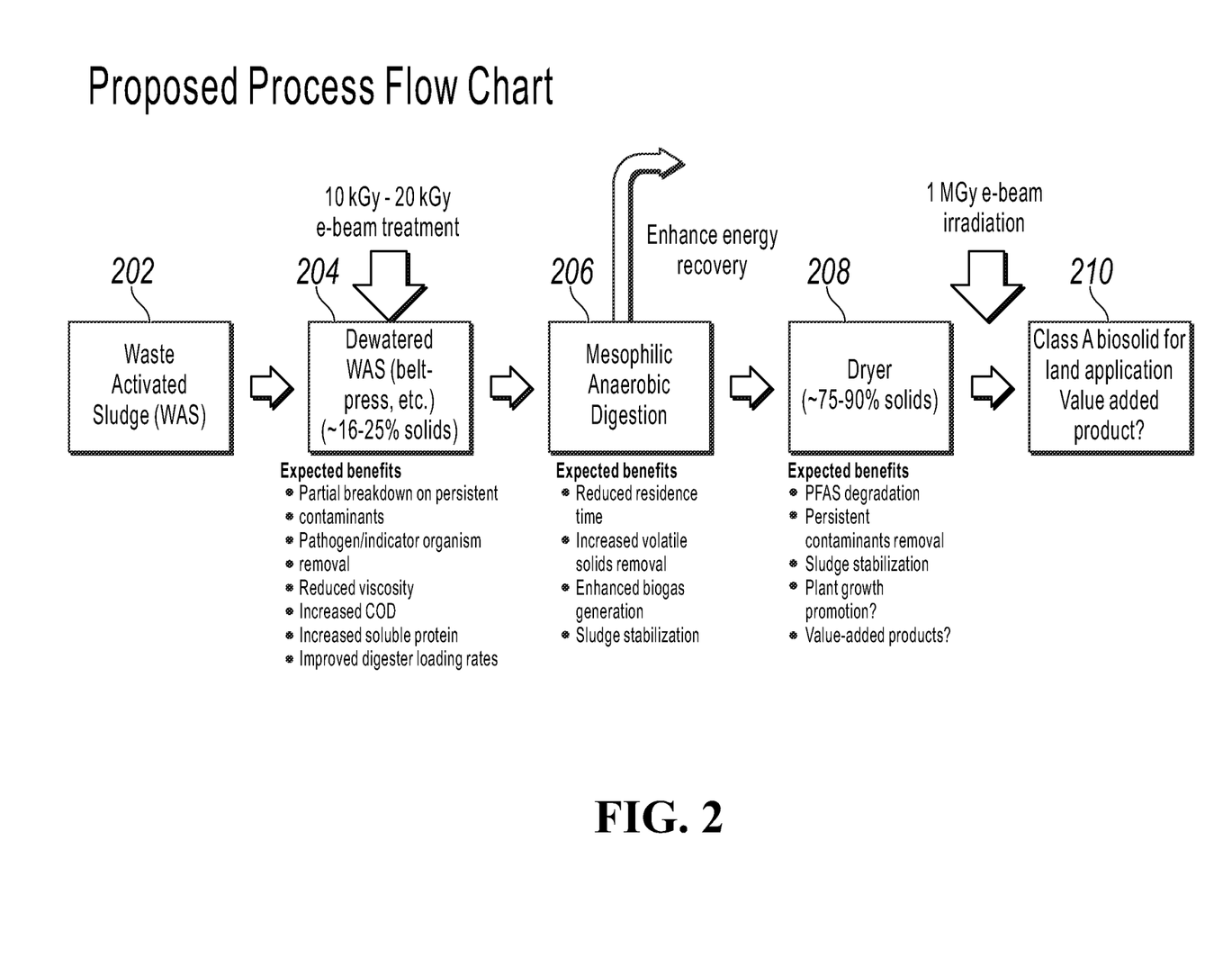
FIG. 2 is a flow diagram of a process for waste treatment according to aspects of the disclosure.

FIG. 2 is a flow diagram of a process 200 for waste treatment. In block 202 a waste matrix is treated to form an activated waste matrix such as, for example, sludge. As used herein, the term "sludge" refers to a semi-solid slurry that can be produced from a range of industrial processes, from water treatment, wastewater treatment or on-site sanitation systems. For example, sludge can be produced as a settled suspension obtained from conventional drinking water treatment, as sewage sludge from wastewater treatment processes, or as fecal sludge from pit latrines and septic tanks. In various embodiments, the waste matrix could be any waste matrix including, for example, sewage, industrial wastewater, contaminated soil, spent filtration media, or other materials; however, anerobic digestion and biogas production only occurs during treatment of, for example, sewage sludge and wastewater and not during treatment of other waste matrices. Formation of the activated waste matrix, in various embodiments, involves treating the waste matrix utilizing aeration and a biological flock of bacteria and protozoa. At block 204, the activated waste matrix is subjected to a dewatering process to form partially-dewatered matrix that is approximately 16% to approximately 25% solid. In various embodiments, the dewatering is accomplished utilizing, for example, a belt filter press; however, in other embodiments, other equipment or methods could be utilized. The partially-dewatered matrix is subjected to a first electron-beam radiation dosage on the order of approximately 10-20 kilogray (kGy). The first electron-beam radiation dose facilitates partial breakdown of easily degradable contaminants and facilitates the elimination of microbial pathogens. Additionally, the first electron-beam radiation dosing results in reduced viscosity of the partially-dewatered sludge matrix, which improves digester loading rates, enhances dewatering, and increased soluble protein and organic carbon which facilitates reduced digester evidence times.

Still referring to FIG. 2, at block 206, after the first electron-beam radiation dose, the partially-dewatered matrix is transferred to an anaerobic digester where it undergoes mesophilic anaerobic digestion. In various embodiments, the mesophilic anaerobic digestion produces biogas 207 such as, for example, methane. The biogas 207 is recovered from the digester. The first electron-beam radiation dose reduces residence time of the partially-dewatered matrix in the digester and partially degrades poly and per fluorinated chemical compounds (PFAS) such as, for example perfluorobutanesulfonic acid (PFBS), PFOA (perfluorooctanoic acid, and perfluorooctanesulfonic acid PFOS). Other recalcitrant chemicals, including, for example, emerging contaminants and unidentified contaminant, can also be broken down due to the very high activation energy provided by the energetic electrons. Additionally, the first electron-beam radiation dose leads to enhanced biogas recovery and sludge matrix stabilization. This is achieved because electron beam irradiation characterized by the high dose rate will change the fundamental physical and chemical characteristics of the matrix and facilitate efficient breakdown of degradable organic compounds in the anaerobic digester (stabilization). This will include but is not limited to changes in alkalinity, reduction in the aggregation of matrix floc size, increases in soluble chemical oxygen demand (due to breakdown of solids), increases in protein concentration, and decreases in volatile fatty acids such as propionic acid which facilitates elimination of possible vector attraction that is, for example, sludge stabilization. These changes facilitate the biological conversion of substrate to methane in the digester resulting in increases in methane yields.

Still referring to FIG. 2, at block 208, the partially-dewatered matrix is transferred from the digester to the dryer where the partially-dewatered matrix is dried to form fully-dewatered matrix having approximately 75% to approximately 90% solid material. After drying, the fully-dewatered matrix is subjected to a second electron-beam radiation dosage on the order of approximately 1 Megagray (MGy) (1,000 kGy) to approximately 2 MGy. The second electron-beam radiation dose results in PFAS degradation and removal of persistent contaminants by the breakdown of the carbon-fluorine (C—F) bonds and other organic bonds. Primary and secondary electrons, caused by scattering collisions, in the beam have energy well in excess of the bond energy of all chemical bonds. For example, the C—F bond, one of the strongest in organic chemistry, has an energy of about 544 kJ/mol. The material irradiation begins with electrons in the range of 0.5 to 10 MeV. During the cascade of electron deenergizing processes, many electrons with energy comparable to and in excess of this energy are generated and penetrate great distances into the treated material. Molecules containing C—F bonds and other recalcitrant chemicals, including, for example, emerging contaminants and unidentified contaminants, can also be broken down due to the very high activation energy provided by the energetic electrons. The energetic electrons may directly target contaminant molecules breaking an initial bond within them and allowing for further degradation and chain reactions. Radiolytic products are also formed from the non-target molecules, such as the water and solid matric. These radiolytic products may also be reactive with the target contaminant molecules. Important radiolytic products include, for example, aqueous electrons, solvated electrons, hydroxyl radicals, peroxides, electronically excited states of molecules (e.g. $O_2$ singlet delta), superoxide, ozone, atomic hydrogen, molecular ions, free radicals, and other reactive species.

Various pathways of chemical activity are excited by the electron beam. Some of these pathways are more efficient in the destruction of target contaminant molecules. The efficiency of the processes can be modified by tailoring of the matrix electron-beam dose, non-target, molecules which the contaminant resides in. For example, certain chemicals have higher cross sections for degradation reaction from reducing reactions, while other chemical will degrade faster through oxidizing reactions. For example, PFOA molecules are shown to be susceptible to both oxidative and reductive processes, whereas PFOS molecules are more degraded by reductive processes. Through the addition of additive chemicals prior to the irradiation process and due to modifications of the matric itself during the electron-beam irradiation process, the nature of the irradiation matrix and radiolytic products can change affecting the reaction rates, dose requirements, energy requirements, and efficiency of the overall degradation process. For example, heat generated during the electron-beam irradiation process increases the temperature of a water or moist matrix which in turn can cause additional organic pollutant degradation. The high electron-beam dose rate during electron-beam dosing rapidly reduces the oxygen content of the treated matrix. In the anoxic or reduced oxygen environment reductive rather than oxidative radiolytic reactions predominate resulting in the breakdown of highly recalcitrant PFAS compounds. This heat generated commensurate with the e-beam can thus accelerate the contaminant degradation. In various embodiments, an anoxic environment can also be generated, if needed, by additives such as additional septage and bubbling nitrogen or other oxygen free gas through the moist matrix. Additionally, the second electron-beam radiation dose further stabilizes the fully-dewatered matrix. Stabilization of matrix refers to the lack of further putrefaction of the matrix material, production of volatile compounds which in turn results in reduced attraction of vectors such as flies etc. Stabilization can also be characterized by the lack of characteristic matrix odors. Following the second electron-beam radiation dose, the fully-dewatered matrix becomes a class A bio solid, as defined by the Environmental Protection Agency, appropriate, for example, in land applications as indicated in block 210. Land application of stabilized matrix is practiced around the world to dispose of treated municipal bio solids in an environmentally sustainable manner. Following the second electron beam radiation dose, the treated matrix material can have value as, for example, a plant growth promoting medium or other value-added product such as, for example, soil amenders and bio-char, which in turn could have economic value.

Use of the first electron-beam radiation dose and the second electron-beam radiation dose results in a more efficient overall process than previous energetic waste-treatment methods. This is due to the intermediate energy recovery process process and shortened digester residence times. Additionally, the first electron-beam radiation dose and the second electron-beam radiation dose can directly volatize and reform hydrocarbons and carbon-containing contaminants to gaseous fuels. Also, certain contaminants will be crosslinked reducing their mobility and making them easier to remove. Further, volumetric heating simplifies material handling. Also recalcitrant pollutants such as PFAS are effectively remediated by the proposed concept. Additionally, the first electron-beam radiation dose and the second electron-beam radiation dose facilitate production of fixed carbon (also referred to as "char") and which is beneficial for soil health.

Figure 3:
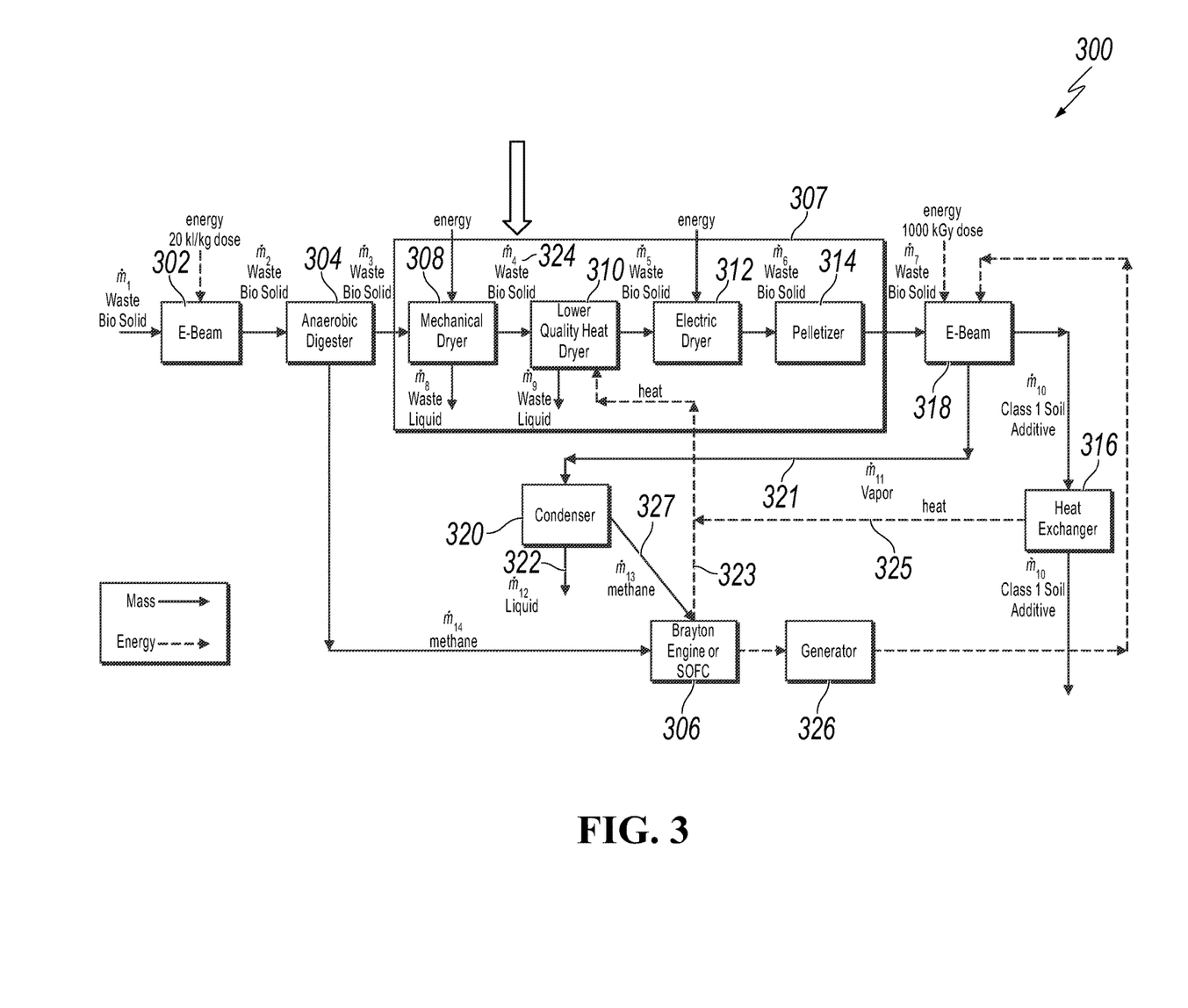
FIG. 3 is a flow diagram illustrating a process for waste treatment and extraction of methane and soil amenders according to aspects of the disclosure.

FIG. 3 is a flow diagram illustrating in a detailed manner a process 300 for waste treatment. At block 302, waste matrix is subjected to a first electron-beam treatment. In various embodiments, the waste matrix is, for example, contaminated sludge or soil of varying moisture content. In various embodiments, the waste matrix could be any waste matrix including, for example, sewage, industrial wastewater, contaminated soil, spent filtration media, or other materials; however, anaerobic digestion and biogas production only occurs during treatment of, for example, sewage sludge and wastewater and not during treatment of other waste matrices. The first electron-beam treatment has a magnitude of approximately 20 kGy. In various embodiments, the waste matrix is approximately 3% to approximately 5% solid by mass. The first electron-beam radiation dose facilitates partial breakdown of persistent contaminants and facilitates the removal of certain pathogens and indicator organisms. Additionally, the first electron-beam radiation dose results in reduced viscosity of the waste matrix, improved digester loading rates, and increased soluble protein. The first electron-beam radiation dose partially degrades poly and per fluorinated chemical compounds (PFAS) such as, for example perfluorobutanesulfonic acid (PFBS), PFOA (perfluorooctanoic acid, and perfluorooctanesulfonic acid PFOS). Other recalcitrant chemicals, including, for example, emerging contaminants and unidentified contaminant, can also be broken down due to the very high activation energy provided by the energetic electrons. Additionally, the first electron-beam radiation dose leads to enhanced biogas recovery and matrix stabilization. This is achieved because electron beam irradiation characterized by the high dose rate will change the fundamental physical and chemical characteristics of the matrix. This will include but is not limited to changes in alkalinity, reduction in the aggregation of matrix floc size, increases in soluble chemical oxygen demand (due to breakdown of solids), increases in protein concentration, and decreases in volatile fatty acids such as propionic acid. These changes facilitate the biological conversion of substrate to methane in the digester resulting in increases in methane yields.

Still referring to FIG. 3, at block 304, after the first electron-beam radiation dose, the waste matrix is transferred to a digester where it undergoes mesophilic anaerobic digestion and forms a waste bio solid. In various embodiments, the mesophilic anaerobic digestion produces biogas 107 such as, for example, methane. The biogas 107 is recovered from the digester and is utilized to power a heat source 306. In various embodiments, the heat source 306 may be, for example, a Brayton engine or a solid-oxide fuel cell. The first electron-beam dose reduces residence time of the waste matrix in the digester and also improves sludge loading rates into the digester.

Still referring to FIG. 3, after leaving the digester, the waste bio solid enters a de-watering phase 307. In various embodiments, the de-watering phase 307 includes a mechanical dryer 308, a lower quality heat dryer 310, and electric dryer 312, and a pelletizer 314. When entering the pelletizer 314, the waste bio solid is approximately 90% solid. In various embodiments, the mechanical dryer 308 is, for example, a screw-press dryer capable of accepting waste bio solid that is approximately 2% solid and outputting waste bio solid that is approximately 30% bio solid. In various embodiments, the electric dryer 312 may be, for example a skip dryer capable of accepting waste bio solid that is approximately 30%-50% solid and outputting waste bio solid that is approximately 90% solid. Additionally, the lower quality heat dryer 310 may utilize heat generated by the heat 323 source 306 as well as heat 325 recovered from a heat exchanger 316 to further dry the waste bio solid. After leaving the electric dryer 312, the waste bio solid enters the pelletizer 314 where the 90% solid waste bio solid is transformed into a commercially-usable soil additive such as, for example, Class A bio solids, as defined by the Environmental Protection Agency, for unrestricted land application as agriculture fertilizer, household horticulture fertilizer, soil amender for re-forestation or re-vegetation purposes, a soil amender for soil reclamation purposes, or a bio-char of environmental applications. By way of example, FIG. 2 has illustrated the de-watering phase 307 as including the mechanical dryer 308, the lower quality heat dryer 310, and the electric dryer 310; however, in other embodiments, one or more of the mechanical dryer 308, the lower quality heat dryer 310, and the electric dryer 310 may be omitted from the de-watering phase 307 depending on the moisture content of the waste bio solid.

Still referring to FIG. 3, after leaving the pelletizer 314, the dried waste bio solid is subjected to a second electron-beam radiation treatment at block 318. In various embodiments, the second electron-beam radiation treatment has a magnitude of, for example, approximately 1,000 kGy to approximately 2,000 kGy. The second electron-beam treatment transforms the waste bio solid into a Class A soil additive, as defined by the Environmental Protection Agency. After the second electron-beam radiation treatment, the waste bio solid enters the heat exchanger 316 where heat from the class I soil additive is extracted and utilized to power the lower quality heat dryer 310. Upon leaving the heat exchanger 316, the class I soil additive is commercially usable. The second electron-beam radiation treatment produces vapor 321 that is desorbed from the waste bio solid. The vapor 321 is passed to a condenser 320, where methane 327 is extracted to the heat source 306. Liquid 322 is also extracted for commercial use. In various embodiments, the liquid 322 may be a hydrocarbon or a combination of hydrocarbons such as, for example, gasoline. In various embodiments, the heat source 306 is coupled to a generator 326. In various embodiments, the generator 326 is utilized to power the second electron-beam radiation treatment 318.

Still referring to FIG. 3, arrow 324 represents addition of additional materials to the de-watering phase 307. By way of example, the additional materials 324 are illustrated in FIG. 2 as being added prior to the introduction of the waste bio solid to the lower quality heat dryer 310; however, in other embodiments, the additional materials 324 could be added at any point in the de-watering phase 307 or after the de-watering phase 307 depending on the moisture content of the additional materials 324. In various embodiments, the additional materials could include, for example, contaminated soil as well as spent granular activated carbon (GAC) and other filter media such as, for example, resins. In various embodiments, the additional materials could also include, for example, high pH chemical additives such as, for example, nitrates, carbonates, and particulate coal combustion products, also known as flyash. High pH additives have been demonstrated to facilitate an increased lifetime of aqueous electrons following the administration of the second electron-beam radiation dose. Such a phenomenon has been shown to enhance the breakdown of PFAS compounds such as perfluorooctanesulfonic acid (PFOS). In various embodiments, the high pH chemical additives could also be contaminated and require electron-beam radiation treatment. Thus, the second electron-beam radiation treatment 318 could, in various embodiments, be utilized for the remediation of the chemical additives such as, for example, flyash.

EXPERIMENTAL RESULTS

High electron-beam radiation dose experiments were performed with unamended, moist PFOS-laden field-obtained soil samples with doses from approximately 250 to approximately 1000 kGy. Electron beam doses up to approximately 1000 kGy were able to reduce PFOS concentrations by 31%. As was noted with the groundwater samples, PFOA initially increased by 48% after the 250 kGy irradiation. Exposure to a higher dose of approximately 1000 kGy then appeared to reduce PFOA.

The high soil moisture content appears to slightly reduce the efficiency of electron-beam remediation of PFAS-contaminated soils and appeared to reduce PFOA and PFOS degradation, possibly due to the electron energy being consumed for vaporizing the water and generation of radicals rather than directly react with PFAS molecules. To identify the role of soil moisture on electron-beam remediation of PFAS, the subsequent electron-beam soil treatment studies were performed with soil samples that were oven-dried to approximately 10% moisture content and exposed to approximately 2000 kGy. To ensure experimental reproducibility, these soil experiments were performed in triplicate and the samples were analyzed at the commercial laboratory. PFOS and PFOA degraded significantly in soils ($p<0.01$) when exposed to approximately 2000 kGy. When the approximately 10% moist soil was exposed to 2000 kGy, a 99.9% degradation of PFOS was observed. In comparison, in the approximately 84% moist soils, the PFOS reduction was only 86.7%. The PFOS concentration decreased from 513.8 ng/g dry weight) to 0.8 ng/g dry weight in the 10% moist soil samples. PFOA did not exhibit the same sensitivity to moisture content compared to PFOS. The PFOA reduction observed in the 84% moist soil was 90.5% while in the 10% moist soil it was 86.4%. When comparing the untreated and the electron-beam treated soil samples there were statistically significant differences between the untreated and the electron-beam treated samples for both PFOS and PFOA. While there was a significant difference in the PFOS degradation in the 84% and the 10% moist soil conditions, there was no significant difference in the PFOA concentrations when comparing the 84% moist soil and the 10% moist soil samples. These observations support the hypothesis that the plausible mechanisms for PFOS and PFOA removal in soils under high electron-beam dose conditions may be different. The degradation of PFOS was enhanced by low soil moisture conditions (under high electron-beam doses) suggesting that the PFOS removal mechanism may also involve thermal reactions; the relatively dry soil sample reaching a higher temperature because less energy was consumed by heating and vaporizing water in the sample.

Complete vaporization of water from an initial temperature of 20° C. requires approximately 2900 kJ/kg, so less than half the water was removed during the 1000 kGy treatment as compared to the 2000 kGy treatment. Prior to evaporation, the remaining soil moisture would moderate any temperature rise in the soil, preventing substantial thermal removal or degradation of less volatile PFASs. Because PFOA thermally decomposes at a higher temperature than PFOS (700° C. for PFOA as compared to 600° C. for PFOS it possible that at 2000 kGy, the soil sample at 10% soil moisture reached temperatures to achieve a greater breakdown of PFOS as compared to PFOA. It is also possible that the reductions were the result of radical-initiated degradation and reached equilibrium at a concentration of approximately 1-2 ng/g dry weight or terminated when there was no water available for radical generation. The soil sample had detectable levels of 14 different PFAS initially (Table 1). The degradation (% breakdown) of other PFAS in this soil sample at 2000 kGy in the 84% moist soils and the 10% moist soils is shown in Table 1. Out of 14 detectable PFAS in the soil sample, 2000 kGy dose was able to achieve 100% breakdown of 9 PFAS when the soil moisture content was 10%. Only PFBS exhibited less than 50% breakdown. In the 84% moist soil samples, the PFAS breakdown ranged between a 100% and 78%. PFBS was degraded by 78% in the wetter soil sample.

TABLE 1

| PFAS | % Breakdown in 2000 kGy | |
|---|---|---|
| | 84% Soil Moisture | 10% Soil Moisture |
| Fluorotelomer Sulfonic Acids | | |
| 4:2 Fluorotelomer sulfonic acid (4:2 FtS) | 100% | 100% |
| 6:2 Fluorotelomer sulfonic acid (6:2 FtS) | 94.1% | 100% |
| 8:2 Fluorotelomer sulfonic acid | 93% | 100% |
| perfluorooctanesulfonic acid (PFOS) | 86.7% | 99.9% |
| PFOSA | 100% | 100% |
| Perfluoroalkane carboxylates | | |
| Perfluorodecanoic acid (PFDA) | 100% | 100% |
| Perfluorononanoic acid (PFNA) | 100% | 100% |
| Perfluorooctonoic acid (PFOA) | 90.5% | 86.4% |
| Perfluoroheptanoic acid (PFHpA) | 99.2% | 99.2% |
| Perfluorohexanoic acid (PFHxA) | 98.5% | 99.3% |
| Perfluoropentanoic acid (PHPeA) | 99.5% | 99.5% |
| Perfluorobutanoic acid (PHBA) | 90.1% | 78.1% |

Depending on the embodiment, certain acts, events, or functions of any of the processes described herein can be performed in a different sequence, can be added, merged, or left out altogether (e.g., not all described acts or events are necessary for the practice of the processes). Moreover, in certain embodiments, acts or events can be performed concurrently, e.g., through parallel processing, or multiple electron-beam processors rather than sequentially. Although certain steps in the process are described as being performed by a particular device, other embodiments are possible in which these tasks are performed by a different device.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of waste treatment, the method comprising:
   treating a partially dewatered matrix with a first electron beam radiation dose;
   drying the treated partially dewatered matrix to form a fully dewatered matrix;
   treating the fully dewatered matrix with a second electron beam radiation dose;
   condensing vapor formed from the second treating step; and
   recovering methane from condensed vapor.

2. The method of claim 1 wherein the first electron beam radiation dose is on the order of approximately 10 kGy-approximately 20 kGy.

3. The method of claim 1, wherein the second electron beam radiation dose is on the order of approximately 0.5 MGy-approximately 2 MGy.

4. The method of claim 1, wherein the drying results in the fully dewatered matrix being in the range of approximately 75% solid and approximately 90% solid.

5. The method of claim 1, wherein, following the second electron beam radiation dose, the fully dewatered matrix is transformed to a class A biosolid.

6. The method of claim 1, wherein the second electron beam radiation dose results in PFAS degradation.

7. The method of claim 1, further comprising, transferring, after the first treating, the treated partially dewatered matrix to a digester where the treated partially dewatered matrix is subjected to anaerobic digestion.

8. The method of claim 1, wherein the first electron beam radiation dose and the anaerobic digestion enhances recovery of biogas.

9. The method of claim 1, comprising adding a chemical additive to the partially dewatered matrix.

10. The method of claim 9, wherein the chemical additive comprises flyash.

11. The method of claim 1, comprising removing heat from the treated fully dewatered matrix via a heat exchanger.

12. The method of claim 1, further comprising producing, via a Brayton engine or solid oxide fuel cell, energy using the methane.

13. The method of claim 12, wherein the drying utilizes the energy produced from the methane.

14. A system for waste treatment, the system comprising:
   a first source of electron beam radiation for treating a partially dewatered matrix;
   a dewatering stage positioned downstream of the first source of electron beam radiation; and
   a second source of electron beam radiation positioned downstream of the dewatering stage; and
   a condenser positioned downstream of the second source of electron beam radiation.

15. The system of claim 14, wherein the dewatering stage is a belt filter press.

16. The system of claim 14, wherein the first source of electron beam radiation is on the order of approximately 10 kGy-approximately 20 kGy.

17. The system of claim 14, wherein the second source of electron beam radiation is on the order of approximately 0.5 MGy-approximately 2 MGy.

18. The system of claim 14, wherein the dewatering stage comprises:
   a mechanical dryer;
   a lower quality heat dryer; and
   an electric dryer.

19. The system of claim 14, comprising a heat exchanger coupled to the dryer.

20. The system of claim 14, wherein the condenser is coupled to the dryer.

* * * * *